United States Patent [19]

McGuffin

[11] 4,371,959
[45] Feb. 1, 1983

[54] POSITION SENSOR FOR VIDEO DISC

[75] Inventor: William G. McGuffin, Willingboro, N.J.

[73] Assignee: RCA Corporation, New York, N.Y.

[21] Appl. No.: 174,025

[22] Filed: Jul. 31, 1980

[51] Int. Cl.³ ............................................. G11B 9/06
[52] U.S. Cl. ...................................... 369/43; 369/48; 369/126
[58] Field of Search .................... 369/43, 47, 48, 126; 358/128.5, 128.6

[56] References Cited

U.S. PATENT DOCUMENTS

| 4,152,641 | 5/1979 | Hughes et al. | 369/126 X |
| 4,280,023 | 7/1981 | Christopher | 369/43 |

Primary Examiner—Bernard Konick
Assistant Examiner—Donald McElheny, Jr.
Attorney, Agent, or Firm—E. M. Whitacre; J. S. Tripoli; E. P. Herrmann

[57] ABSTRACT

A stylus position sensor for a video disc player is described. An electrode secured in fixed relation to a movable stylus with respect to the stylus supporting carriage is disposed between first and second electrodes to form first and second variable capacitors therewith. The capacitance of the variable capacitors change in accordance with the motion of the stylus related electrode between the first and second electrodes. First and second varactor diodes are respectively serially connected with the first and second variable capacitors and poled in a complementary manner with respect to each other. The net capacitance at said third electrode comprises the parallel combination of the two respective series combinations of variable capacitor and varactor diode. The capacitance of the variable diodes is modulated by an AC signal potential coupled from a low impedance source through respective coupling capacitances. As the center electrode is displaced from the center position with respect to the first and second electrodes, the net capacitance at the center electrode increases and decreases in phase with the modulating capacitance of the varactor diode connected to the electrode toward which the stylus moved. A capacitance sensitive pickup circuitry converts the net capacitance change to a signal potential for controlling a servo motor to adjust the carriage position.

8 Claims, 4 Drawing Figures

POSITION SENSOR FOR VIDEO DISC

This invention relates to a video disc player apparatus, and in particular to a system for determining the relative position of a signal pickup stylus with respect to the carriage assembly which translates the pickup stylus radially across the disc record.

A capacitive type video disc system comprises a high density storage medium in the form of a disc record containing information prerecorded in the form of geometric variations of conductive material disposed in concentric tracks or spiral convolutions proximate the surface of the disc and an apparatus for recovering the information in the form of an electrical signal for use by a television receiver. The playback apparatus includes a signal pickup stylus which engages the information tracks and forms a capacitance therewith, the capacitance varying in accordance with the geometric variations when relative velocity is created between the track and the pickup stylus. The varying capacitance is coupled to a tuned or resonant signal pickup circuit to modulate the resonant frequency thereof and ultimately amplitude modulate a carrier frequency, e.g., 915 MHz, applied to the circuit. The amplitude modulated carrier is detected to produce the electrical manifestation of the recorded signal.

The density of information required to make an acceptable video disc is extremely high. As a result, the information tracks have a close spacing, e.g., a pitch of less than 3 micrometers. A practical consequence of such close track spacing is that the signal pickup stylus be mechanically translated across the record in the radial direction by a drive mechanism to maintain the proper stylus-track relationship. Certain systems utilize disc records having information tracks in the form of a spiral groove convolution. The signal pickup styli for such systems are contoured to fit within the groove walls and thereby track the groove. The stylus is fitted to a stylus arm compliantly coupled to a carriage assembly which is driven by motive means radially across the disc at a generally uniform rate in conformance with the radial translation of the groove tracking stylus. However, the information tracks are typically eccentric with respect to the axis of rotation of the disc. Thus, the stylus/stylus arm assembly is arranged for limited movement with respect to the carriage in the direction radially across the disc.

The stylus is subject to displacement from the groove convolutions by disc defects, which displacement may result in significant radial translation of the stylus from the convolution of normal play. The displacement affects the stylus-carriage positional relationship and may cause an undesirable mechanical bias between the stylus and disc or between the stylus arm and carriage. It is therefore desirable to monitor the relative position of the stylus/stylus arm with respect to the carriage or more particularly with respect to its unbiased or relaxed position in the carriage and correct the carriage position with respect to the stylus. To this end, Christopher in copending application Ser. No. 55,976 filed July 9, 1979 now U.S. Pat. No. 4,280,023, assigned to the same assignee as the present invention, disclosed a stylus position sensing system incorporating a position sensitive capacitance, or PSC, between the carriage and the stylus arm, serially connected with a varactor diode which in turn was driven through a resistor by a constant frequency potential (pilot signal). The serially connected PSC and varactor diode are arranged in parallel with the varying stylus-disc signal capacitance so that capacitance changes in the serially connected pair are converted to signal potentials by the resonant signal pickup circuit. The stylus position information is separable from the recorded information signals by virtue of the position information occurring as amplitude modulations of the constant frequency pilot signal. Subsequently, Christopher, in application Ser. No. 116,249 filed Jan. 28, 1980, disclosed an improved balanced position sensitive capacitor-varactor stylus position sensing system wherein a serially connected PSC and varactor diode pair are arranged between the stylus arm and carriage on both sides of the stylus arm and energized with a single pilot signal. Both varactor diodes are connected to the pilot signal source through relatively high resistance resistors to prevent the 915 MHz carrier signal used in the signal pickup circuit from feeding back to the pilot signal source and thereby other parts of the playback apparatus. As in the former system, the position signal is derived as an amplitude modulated pilot signal. The amount of stylus displacement and the direction of displacement relative to its relaxed position are respectively indicated by the amplitude and the phase of the pilot signal. This information is reduced to a bipolar control signal by detecting the recovered pilot signal with a synchronous detector wherein signal directly from the pilot signal source is used as a reference.

The present inventor, in assembling a playback apparatus requiring precise control of the stylus/stylus arm-carriage relationship, found the balanced Christopher system to be unacceptable. By virtue of energizing the varactor diodes through high resistances, the time varying capacitance of the varactors with respect to each other and with respect to the reference signal utilized by the synchronous detector is subject to phase shifts due to parametric changes in the network components, e.g., thermal drifts and aging. The phase shifts result in errors in the position signals produced by the system.

In accordance with the present invention, a stylus position sensing system is described which eliminates the phase shift in the foregoing balanced sensor system resulting in a more precise carriage servo. A precision balanced stylus position sensing system comprises first and second position sensitive capacitances arranged between the stylus arm and the carriage on either side of the stylus arm respectively. First and second varactor diodes are respectively serially connected with the first and second position sensitive capacitors, the pairs of serially connected position sensitive capacitances and varactor diodes being connected in parallel relationships with the stylus-disc record signal capacitance. The first and second varactor diodes are poled to conduct toward and away from their respective serially connected position sensitive capacitors. A pilot signal is applied from a low impedance amplifier to regularly modulate the capacitance of the first and second varactor diodes via first and second coupling capacitors, the low drive impedance of the amplifier and inherent parametric stability of the coupling capacitors significantly reducing the occurrence of undesirable phase or amplitude changes in the sensor system.

BRIEF DESCRIPTION OF THE DRAWINGS

The invention will be described in more particularity with the aid of the accompanying drawings:

The interrelationship of a video disc playback apparatus signal pickup stylus, carriage mechanism and associate circuitry are depicted in FIG. 1. In FIG. 1 a carriage assembly 110 supports and translates a signal pickup stylus 114 radially across the disc record 109 in synchronism with the radial travel of the stylus engaging an information track. The pickup stylus 114 engages the disc record through aperture 108 in the carriage, and the carriage is translated by motor 111. The motor is energized by the driver 126 receiving a control signal from detector 125.

Figure 1:
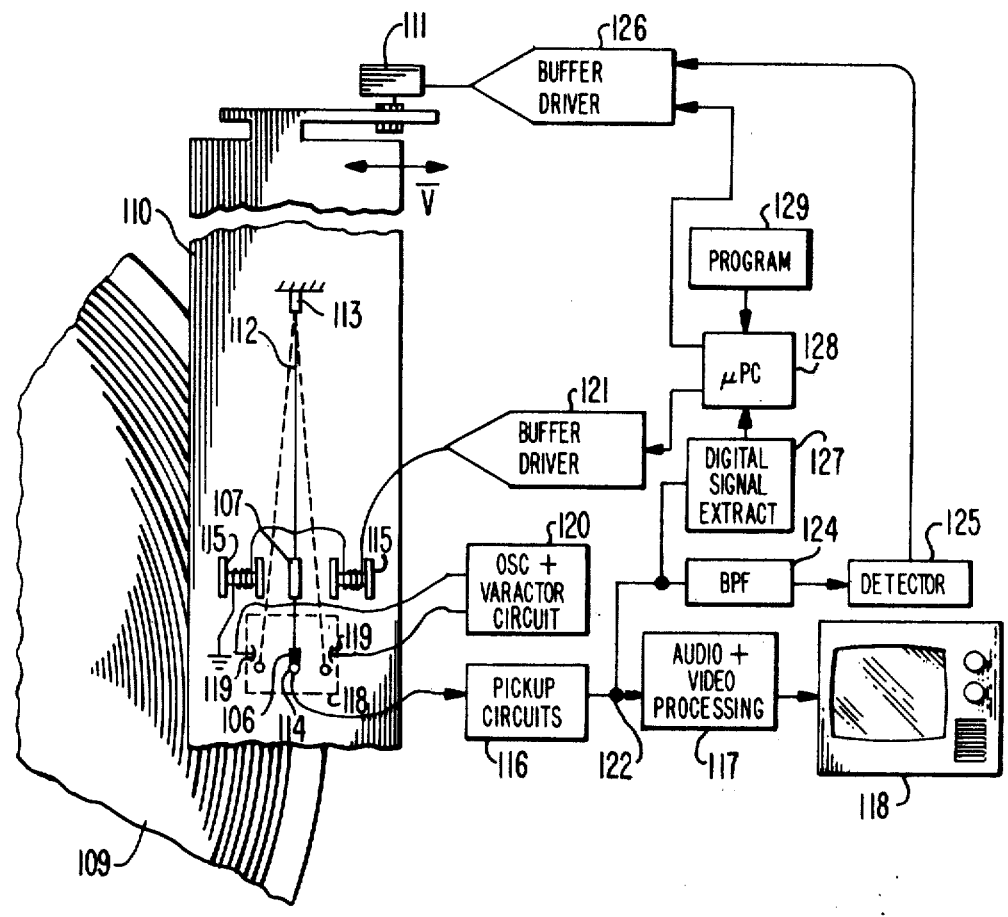
FIG. 1 is a schematic/block diagram of the signal pickup portion of a grooved disc, capacitive pickup video disc system.

The pickup stylus 114 is mounted at the free end of a rigid stylus arm 112. The second end of the stylus arm is secured by compliant coupler 113 to the carriage or to a stylus assembly cartridge (not shown) removably mounted in the carriage. The coupler 113 permits relatively free movement of the pickup stylus with respect to the carriage at least in the direction of movement designated $\overline{V}$ in the drawing and indicated by the stylus arm shown in phantom lines.

The pickup stylus 114 cooperates with the disc record 109 and signal pickup circuitry 116 to recover the prerecorded information on the disc. Recovered signals available from the pickup circuitry at connection 122 are conditioned by the audio and video processing circuitry 117 for application to the antenna input terminals of a standard television receiver 118.

The FIG. 1 apparatus includes a stylus position sensor comprising position sensitive capacitances formed between electrodes 119 secured to the carriage and electrode 106 secured to the stylus arm and which is electrically connected to the pickup stylus. The electrodes 119 are serially connected with varactor diodes in circuitry 120 and energized with a 260 KHz oscillatory signal. The respective serially connected PSC and varactor diode pairs are electrically in parallel connection with the stylus-disc signal capacitance such that variations in the respective PSC, i.e., distance between electrode 106 and particular electrode 119 is manifested as an electric signal occurring at 260 KHz at the output connection 122 of the pickup circuitry. The 260 KHz signal is extracted from the recovered information signal by a 260 KHz bandpass filter 124 and applied to detector 125 which generates a control signal related to the phase and amplitude of the recovered 260 KHz signal for energizing the motor 111 to maintain the average position of the stylus centered with respect to the electrodes 119.

The FIG. 1 player also includes a stylus deflection apparatus including electromagnetic coils 115 secured to the carriage 110 and permanent magnet 107 secured to the stylus arm. When current is applied to the coils from driver 121 the magnetic field generated between the coils applies a force to magnet 107 and moves the stylus arm in the appropriate direction designated $\overline{V}$ in the drawing. Typically disc records of this type include ancillary digital information relating to track and field number, etc., in the recorded information. On playback this ancillary information is extracted from the recovered signal by circuitry 127 and applied to microprocessor 128. The microprocessor monitors the recovered ancillary numbers to determine whether the stylus progression is in conformance with the programmed or desired progression and if not, applies the requisite control signal to driver 121. Note that the combination of a servoed arm carriage and a microprocessor controlled stylus deflector permits implementation of special effects. For example, if under program control 129 the microprocessor conditions the buffer 121 to deflect the stylus arm radially inward at a controlled rate faster than the normal tracking progression of the stylus, the stylus position sensing system will condition the motor to drive the carriage in consonance with the average forward velocity of the stylus and fast forward scan of the record may be achieved.

Figure 2:
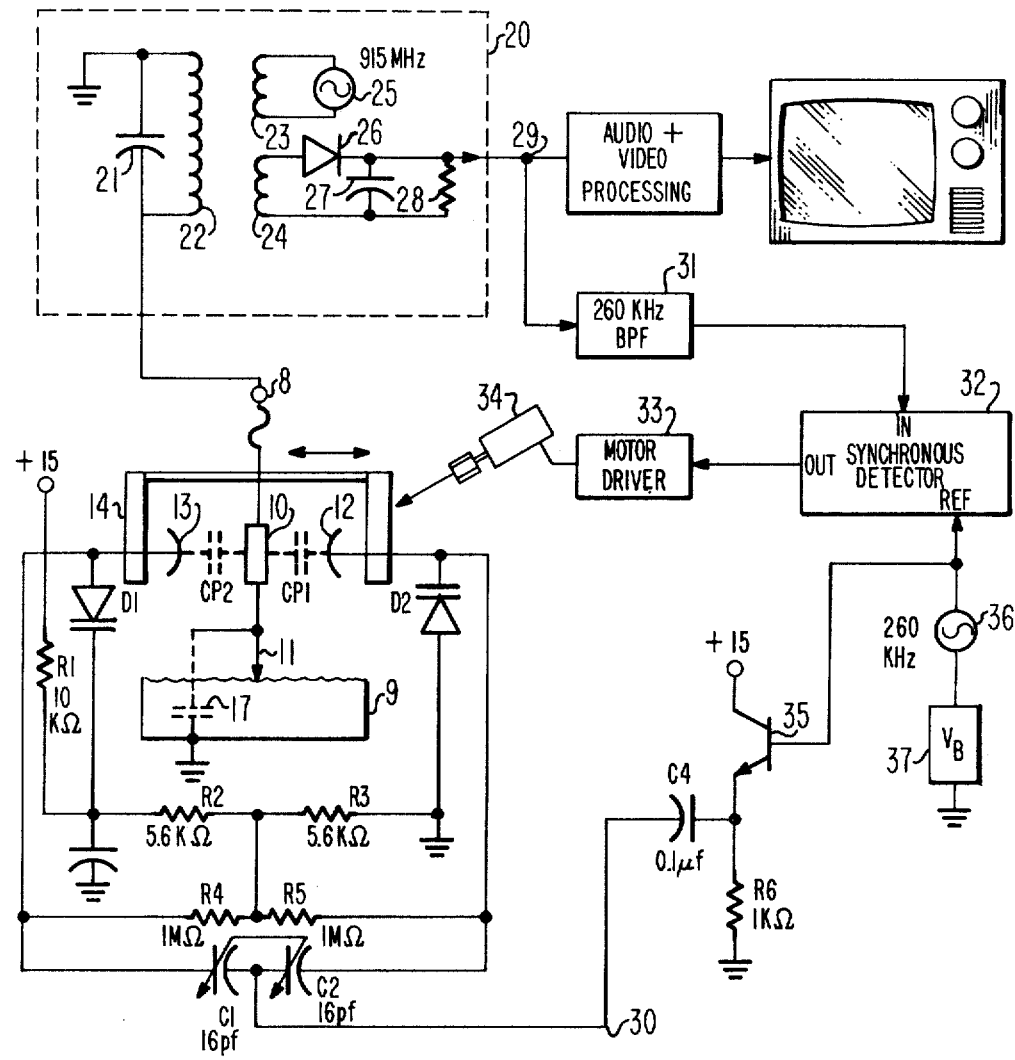
FIGS. 2–4 are schematic circuit diagrams of three variations of a stylus position sensor system embodying the present invention.

FIG. 2 illustrates the position sensor circuitry with more particularity and includes one embodiment of the improvements for reducing stylus position signal errors due to undesired parametric changes in the circuit elements. The circuitry circumscribed by broken line 20 exemplifies one circuit arrangement for detecting small capacitance changes. The inductor 22 and capacitor 21 including fixed stray capacitances occurring between terminal 8 and ground are tuned to resonate near 915 MHz. A 915 MHz carrier signal from oscillator 25 is coupled to the tuned circuit via coil 23. Time varying capacitances, i.e., stylus-disc signal capacitance 17 and position sensitive capacitance between electrodes 10 and 12 and electrodes 10 and 13 occurring between terminal 8 and AC ground potential are in parallel electrical connection with capacitor 21 and tend to change or modulate the resonant frequency of the tuned circuit in accordance with the time variation of capacitance. The modulation of the resonant frequency of the circuit affects the amplitude of the 915 MHz signal coupled thereto in accordance with the time varying capacitance. The amplitude modulated 915 MHz signal is coupled via coil 24 and demodulated in the diode detector comprising diode 26 and the parallel resistor 28-capacitor 27 combination. The output of the diode detector circuit at terminal 29 is an electrical manifestation of the time varying capacitance between terminal 8 and AC ground potential. The stylus position component of the electrical signal at the detector output connection 29 is selectively extracted from the recovered signal by the bandpass filter 31 which is tuned to the pilot signal frequency. The position signal occurs as a phase and amplitude modulated signal at the same frequency as the pilot signal. This signal is applied to synchronous detector 32 for demodulation to a bipolarity signal with repect to a reference signal to control the speed and direction of the carriage motor 34.

Referring again to FIG. 2 and more particularly, to aspects of the servo sensor, a carriage 14 is shown schematically supporting and translating a signal pickup stylus across the disc record 9. The carriage motion is controlled by the servo motor 34 which is energized by the motor drive electronics 33. Two electrodes, 12 and 13, are secured in fixed relation to the carriage 14, and a third electrode 10 is secured in fixed relation to the stylus 11, and disposed between electrodes 12 and 13. Electrodes 10 and 12 form a first stylus position sensitive capacitance CP1 and electrodes 10 and 13 form a second stylus position sensitive capacitance CP2. As stylus 11 and thereby electrode 10 is displaced rightward with respect to carriage 12 the capacitance of CP1 increases as the spacing between the electrodes or plates decreases. Concurrently, the capacitance of CP2 decreases. Alternatively, as the stylus is displaced leftward with respect to the carriage, the capacitance of CP2 increases and CP1 decreases.

A varactor diode D2 is connected between electrode 12 and ground and a second varactor diode D1 is connected between electrode 13 and ground via shunting capacitor C3. Capacitor C3 is large compared to the capacitance of D1 or CP2 and for AC signals may be considered a direct connection to ground. The serially connected combination of CP1 and diode D2 and the combination of CP2 and D1 are in parallel connection with the stylus-disc signal capacitance 17 and therefore in parallel connection with capacitor 21 of the pickup circuitry. Diode D1 is reverse biased via the combination of resistors R1, R2, R3, and R4 and the +15 volt supply. Reverse biasing the varactor diode D1 conditions it to exhibit a voltage variable capacitance. The 1 Meg ohm resistor R4 which is serially connected in the bias network effectively renders the bias network an AC open circuit with respect to AC signals applied at the interconnection of diode D1 and electrode 13. Diode D2 is similarly reverse biased by the combination of resistors R1, R2, R3, and R5 and the +15 volt supply.

Since the position sensitive capacitor CP1 and CP2 respectively increase and decrease by like amounts with a radial stylus displacement and the capacitances of varactor diode D1 and D2 are constant in the absence of an AC signal, there is no net change in the capacitance to ground exhibited at terminal 8 due to the stylus translation. However, the application of a time varying potential across the varactor diodes D1 and D2 conditions the capacitance of the diodes to vary synchronously with the applied potential. In the figure a 260 KHz pilot signal from generator 36 is applied across varactor diodes D1 and D2 by capacitors C1 and C2 respectively. With respect to the AC pilot signal, varactor diodes D1 and D2 are oppositely poled so that as the capacitance of D1 decreases due to an increase in potential thereacross, the capacitance of D2 increases due to an equivalent decrease in potential thereacross and vice versa. Thus, for the stylus centered and CP1 equal to CP2 the time varying capacitances of D1 and D2 do not effect a net change of capacitance between terminal 8 and ground. On the other hand, when the stylus deviates from the centered position by leftward movement such that CP2 is greater than CP1, then the net capacitance at terminal 8 with respect to ground alternately increases and decreases in phase with the applied pilot signal. At the output of the pickup circuit the net capacitance change is manifested as an AC signal in phase with the 260 KHz pilot signal and with an amplitude related to the change in stylus position. Similarly, if the stylus moves rightward relative to the carriage such that CP1>CP2, the net capacitance across terminal 8 will alternately increase and decrease 180° out of phase with the pilot signal. The phase and amplitude of the reconstructed signal from the pickup circuit is indicative of the distance and direction by which the stylus is displaced from the center position.

A time varying impedance is applied to the electrodes 12 and 13, because at low frequencies, relative to the 915 MHz carrier, e.g., 260 KHz, the pickup circuit 20 is insensitive to potential or current signals. Nor is it desirable to utilize a high frequency pilot signal, e.g., 850 MHz. Capacitors C1 and C2 are utilized to apply the pilot signal to the varactor diodes D1 and D2 to generate the time varying impedance because there is no inherent phase shift produced in coupling the pilot signal from connection 30 to the capacitive load presented by the varactor diodes and the CP1 and CP2 capacitances. There being no inherent phase shift in the capacitive circuit coupling the pilot signal to modulate the varactor diode capacitance, parametric changes in the circuit elements will not effect a phase error in the position signal at the output connection 29 of the pickup circuitry 20. Thus, the use of capacitor C1 and C2 to couple the pilot signal to the sensor elements tends to ensure that the system is relatively stable.

The capacitors C1 and C2 are driven from a low impedance source to shunt and preclude the radiation of the 915 MHz signal coupled from the pickup circuit to electrode 10, through the capacitors CP1 and CP2 to connection 30. An emitter follower buffer amplifier comprising transistor 35 and load resistor R6 effectuate the low impedance drive of the signal from the pilot signal oscillator 36 to the capacitor input connection 30. A second consideration requiring the low impedance varactor drive circuit arises because the position signal available at the output connection 29 of the pickup circuit is synchronously detected to produce the motor control signal. The 260 KHz pilot signal is used as a reference for the synchronous detector. Phase changes in the pilot signal between the oscillator 36 and connection 30 due to time varying parametric changes of the circuit elements will affect the amplitude of the control signal ultimately produced by detector 32. It should be evident that the lower the drive impedance of the buffer amplifier, i.e., the emitter follower, the lower the absolute phase difference between oscillator 36 and connection 30 and thus the smaller the potential for significant phase changes occurring due to parametric variations.

To complete the description of FIG. 2, it is noted that provision is made to simultaneously adjust C1 and C2 and thereby equalize the time varying capacitance change in D1 and D2 to null the system. The system may be nulled by adjusting either C1, or C2, or both.

Lastly, circuit element 37 is a dc potential bias supply to condition the transistor 35 for linear operation.

Figure 3:
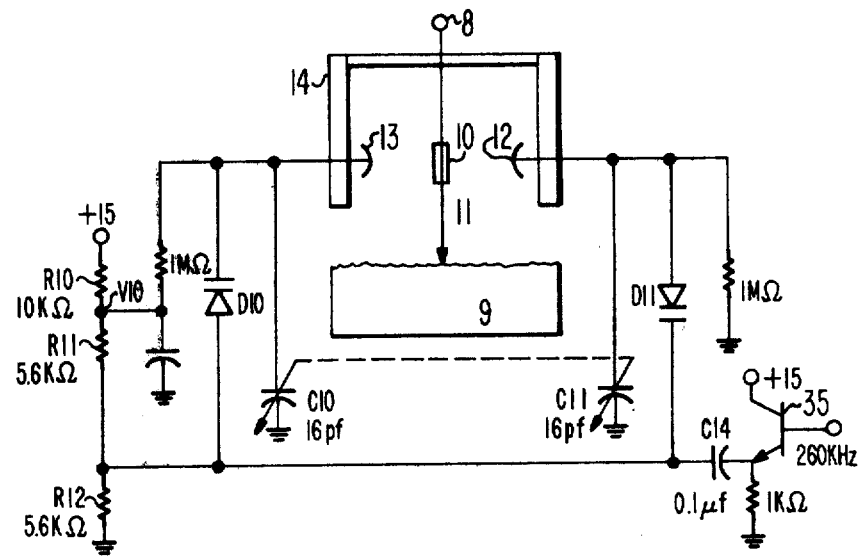

FIG. 3 illustrates an alternative connection of the varactor diodes in a position sensor circuit. Here the varactor diodes D10 and D11, oppositely poled with respect to the AC pilot signal, are directly connected to the low impedance emitter follower buffer amplifier 35 (i.e., the 0.1 uf coupling capacitor C14 is effectively a short circuit at the pilot frequency.) The respective serial combinations of the position sensitive capacitor and varactor diode are in parallel connection with the stylus-disc signal capacitance through the low AC output impedance of the buffer amplifier 35. In this circuit the function of variable capacitors C10 and C11 connected respectively between electrodes 13 and 12 and ground potential is for balancing or nulling the circuit.

Figure 4:
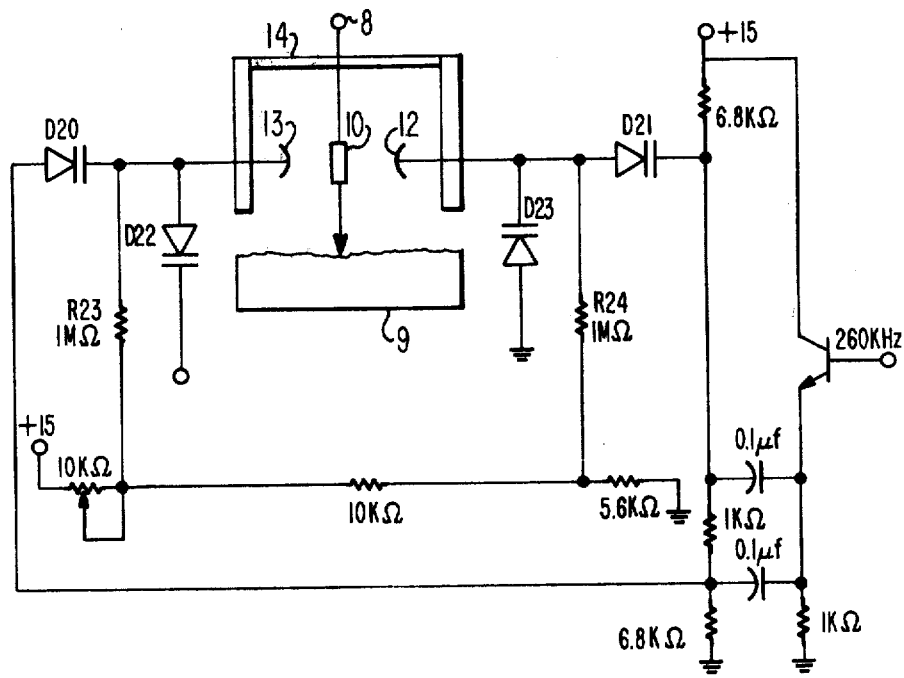

FIG. 4 is a variation of the FIG. 3 circuit wherein the nulling capacitors are implemented with varactor diodes affording the possibility of electronic or adaptive balance of the sensor system. In the FIG. 4 configuration the varactors D20 and D22 are parallel connected with respect to electrode 13. Similarly, diodes 21 and 23 are parallel connected with respect to electrode 12. Both diodes of the diode pairs have their respective capacitances modulated by the pilot signal tending to enhance the amplitude of the stylus position signal. The additional resistors employed in the FIG. 4 circuit are merely to provide reverse bias for each of the varactor diodes. The 1 Megohm resistors R24 and R23 respectively remove the bias resistors from the AC circuit. In both the FIG. 3 and FIG. 4 circuits, the varactor diodes are driven from a low impedance source to shunt the 916 KHz carrier and preclude phase shifts between the reference signal applied to the synchronous detector and the position signal to be demodulated in the synchronous detector since the direction component and amplitude of the motor control signal are related to the phase relationship.

What is claimed is:

1. An improved video disc stylus position sensor system of the type having a signal pickup stylus secured to a stylus arm, said stylus arm being compliantly mounted in a carriage assembly for translating the pickup stylus radially across a record disc and permitting relative movement between the pickup stylus and the carriage assembly, said pickup stylus connected to pickup circuitry for sensing capacitance between said stylus and the disc record, said sensor system having first and second variable capacitors formed by first and second electrodes secured to the carriage and a third electrode disposed therebetween, said third electrode forming one plate of both said first and said second variable capacitors, said third electrode secured in fixed relation to said pickup stylus, and having first and second voltage variable capacitances connected respectively between said first electrode and AC ground potential and said second electrode and AC ground potential, and wherein the stylus position signal is extracted from an output signal from said pickup circuitry by a frequency selective circuit, wherein the improved stylus position sensor comprises:

means for applying a pilot signal;

first and second capacitors each having a first terminal connected to a first node and having respective second terminals connected respectively to said first and second electrodes;

a buffer amplifier having an output terminal connected to said first node and an input terminal connected for receiving said pilot signal, the output impedance of the amplifier being sufficiently small that parametric changes in said impedance do not effect significant phase changes between the pilot signal applied to the amplifier signal input terminal and the pilot signal coupled through said amplifier to the first and second electrodes via said first and second capacitors.

2. In combination:

a video disc signal pickup stylus secured to a stylus arm compliantly mounted to a carriage assembly for translating the pickup stylus radially across a record disc;

first and second electrodes secured in fixed relation to the carriage assembly proximate the pickup stylus and on either side thereof;

a third electrode disposed between said first and second electrodes and having a fixed relation to the pickup stylus and forming first and second capacitors with said first and second electrodes respectively, the capacitance values of said first and second capacitors varying in accordance with the relative position of the pickup stylus with respect to the carriage assembly;

means for applying a pilot signal;

an amplifier having an input terminal connected for receiving said pilot signal and having an output terminal, and wherein the output impedance of said amplifier is sufficiently low that time varying changes in said impedance will not generate significant phase changes between the phase of the pilot signal at the amplifier input terminal and the amplifier output terminal due to capacitive loading thereof;

first and second voltage variable capacitors having respective first terminals connected to said first and second electrodes respectively, and having respective second terminals forming a first terminal pair, arranged so that the capacitance of said first voltage variable capacitance increases for a potential of a first polarity applied to said first electrode and the capacitances of said second voltage variable capacitance decreases for a potential of said first polarity applied to said second electrode;

third and fourth capacitors having respective first terminals connected respective to said first and second electrodes and having respective second terminals forming a second terminal pair;

means connecting one of said first and second terminal pairs to AC ground potential;

means connecting the other of said first and second terminal pairs to the amplifier output terminal;

means responsive to the net capacitance referred to AC ground potential associated with said third electrode for producing a position control signal; and a synchronous detector connected to receive said position control signal at a first input terminal thereof and having a second input terminal connected to said means for applying a pilot signal; said synchronous detector generating a further control signal corresponding to the relative position of the third electrode with respect to said first and second electrodes.

3. The combination set forth in claim 2 wherein the voltage variable capacitors comprise varactor diodes and further including means to maintain said diodes in a reverse biased condition, said bias means being of sufficiently high impedance not to pass the pilot signal in the circuit configuration.

4. The combination set forth in claims 2 or 3 wherein the third and fourth capacitors are respective third and fourth varactor diodes and including means to maintain said third and fourth varactor diodes in a reverse biased condition, said third varactor diode being poled such that its associated junction capacitance increases and decreases under the influence of said pilot signal in concert with said first voltage variable capacitance, said fourth varactor diode being poled such that its associated junction capacitance increases and decreases under the influence of said pilot signal in concert with said second voltage variable capacitance.

5. In a video disc player, a servo system comprising:

a video disc signal pickup stylus secured to a stylus arm compliantly mounted to a carriage assembly for translating the pickup stylus radially across a record disc;

first and second electrodes secured in fixed relation to the carriage assembly proximate the pickup stylus and on either side thereof;

a third electrode disposed between said first and second electrodes and having a fixed relation to the pickup stylus and forming first and second capacitors with said first and second electrodes respectively, the capacitance values of said first and second capacitors varying in accordance with the relative position of the pickup stylus with respect to the carriage assembly;

pickup circuitry electrically connected to said third electrode, said pickup circuitry generating a position signal responsive to the net capacitance occurring between said third electrode and AC ground potential;

a synchronous detector having a first input terminal connected to receive said position signal and having a reference signal input terminal, said detector generating at an output terminal thereof a control signal responsive to the amplitude and phase of said position signal;

motive means coupled to said carriage assembly and responsive to said control signal for translating said carriage and thereby the pickup stylus radially with respect to said disc record;

means for generating at an output terminal thereof a pilot signal having a substantially constant frequency, said output terminal connected to said reference signal input terminal;

a buffer amplifier having an input terminal connected to receive said pilot signal and having an output terminal, the output impedance of said buffer amplifier being sufficiently small to attenuate signals externally coupled thereto derived from said pickup circuitry;

first and second capacitors each having a first terminal connected to said amplifier output terminal and respective second terminals connected respectively to said first and second electrodes; and first and second voltage variable capacitance means having respective first terminals connected respectively to said first and second electrodes and having respective second electrodes connected to AC signal ground potential, said first voltage variable capacitor poled to increase in capacitance for increasing potential of a given polarity applied to the first electrode, and said second voltage variable capacitor poled to decrease in capacitance for increasing potential of said given polarity applied to the second electrode.

6. The video disc player set forth in claim 5 wherein the first and second voltage variable capacitors comprise first and second varactor diodes and further including means to maintain said diodes in a reverse biased condition.

7. The video disc player set forth in claim 6 wherein the bias means comprises:

a dc supply voltage;

a first resistor having a first end connected to said supply potential and having a second end connected to said second end of said first varactor diode;

a second resistor having a first end connected to the second end of said first varactor diode and having a second end connected to a first node;

a third resistor having a first end connected to said first node and having a second end connected to reference potential;

means connecting the second end of said second varactor diode to the second end of said third resistor;

fourth and fifth resistors having respective first ends connected to said first node and having respective second ends respectively connected to said first and second electrodes; and a shunt capacitance connected between the second terminal of said first varactor diode and a point of fixed potential.

8. The video disc player set forth in claim 6 wherein the first and second capacitors are respective third and fourth varactor diodes and further including means to maintain said third and fourth varactor diodes in a reverse biased condition; said third varactor diode poled to increase in capacitance concurrently with said first varactor diode when influenced by output signal from said buffer amplifier and said fourth varactor diode poled to increase in capacitance concurrently with said second varactor diode when influenced by output signal from said buffer amplifier.

* * * * *